(12) United States Patent
Kawashima et al.

(10) Patent No.: US 6,721,097 B2
(45) Date of Patent: Apr. 13, 2004

(54) OPTICAL ELEMENT, ITS MANUFACTURING METHOD AND OPTICAL ELEMENT MANUFACTURING METAL DIE

(75) Inventors: Yoshinari Kawashima, Kanagawa (JP); Nobuo Suematsu, Tokyo (JP); Akira Koshimura, Saitama (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 10/150,978

(22) Filed: May 21, 2002

(65) Prior Publication Data

US 2002/0134751 A1 Sep. 26, 2002

Related U.S. Application Data

(62) Division of application No. 09/487,216, filed on Jan. 19, 2000, now Pat. No. 6,552,863.

(30) Foreign Application Priority Data

Jan. 22, 1999 (JP) .......................................... P11-014064

(51) Int. Cl.⁷ .............................. G02B 27/44; G02B 5/18
(52) U.S. Cl. ...................... 359/566; 359/833; 264/1.1; 264/1.9; 264/1.31; 264/2.5; 249/160
(58) Field of Search ............................ 264/1.1, 2.4, 2.5, 264/1.31, 1.9; 249/135, 160; 216/24; 425/808; 359/831, 833, 838, 566

(56) References Cited

U.S. PATENT DOCUMENTS

| | | | |
|---|---|---|---|
| 2,911,682 A | * 11/1959 | Ewald | .......................... 264/1.9 |
| 4,761,253 A | 8/1988 | Antes | |
| 5,946,147 A | * 8/1999 | Tanaka | .......................... 359/831 |

FOREIGN PATENT DOCUMENTS

| | | |
|---|---|---|
| EP | 1 068 945 | 1/2001 |
| GB | 494480 | 10/1938 |
| GB | 623588 | 12/1946 |
| GB | 623588 | 5/1949 |
| GB | 748142 | 5/1953 |
| GB | 851217 | 10/1960 |
| GB | 1339425 | * 12/1973 |
| JP | 070108536 | 10/1993 |
| JP | 7108536 | 4/1995 |
| JP | 090254161 | 3/1996 |
| JP | 9254161 | 9/1997 |
| JP | 1101149663 | 10/1997 |
| JP | 11084119 | 3/1999 |
| JP | 11114963 | 4/1999 |

OTHER PUBLICATIONS

Australian Patent Office Search Report.

* cited by examiner

*Primary Examiner*—Drew Dunn
*Assistant Examiner*—Leo Boutsikaris
(74) *Attorney, Agent, or Firm*—Rader, Fishman & Grauer PLLC; Ronald P. Kananen

(57) ABSTRACT

Systems and methods of the present invention are directed to an optical element that includes a diffraction grating, an inclined surface, good optical characteristics, and an optical element manufacturing metal die. The optical element manufacturing metal die is capable of injection molding of an optical element having a complex structure. Further, the optical element manufacturing metal die includes nestings that have a plurality of mirror surface forming portions. The pluralilty of mirror surface forming portions include a plurality adjoining pairs of mirror surfaces. The plurality of mirror surface forming portions are molded by two adjoining pairs of the plurality of adjoining pairs of mirror surface forming portions, which are formed on the same nesting. At least one of the plurality of mirror surface forming portions are formed by a mirror surface grinding method. The optical element manufacturing metal die also includes a nesting having a diffraction grating forming portion in which a predetermined concave-convex pattern for molding the diffraction grating is formed on a surface of a substrate.

4 Claims, 15 Drawing Sheets

F I G. 4
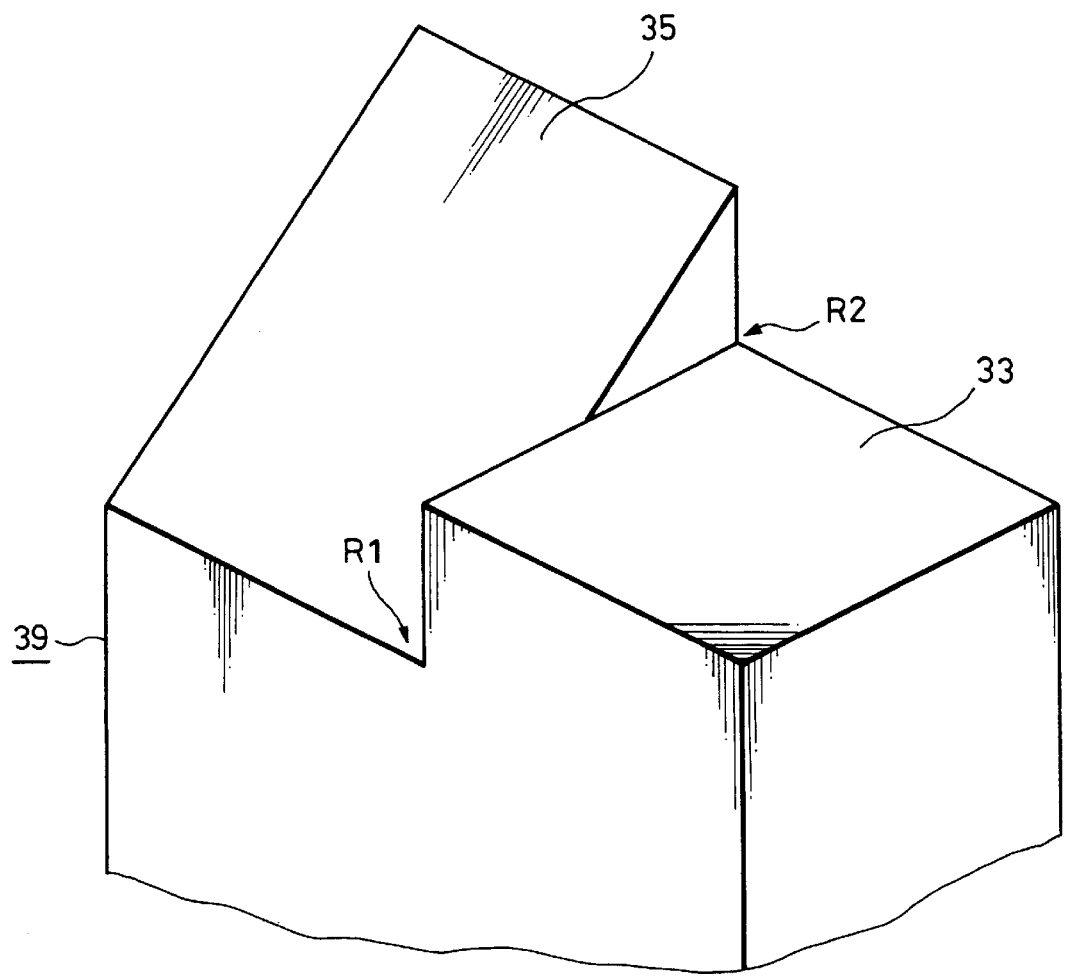

F I G. 14
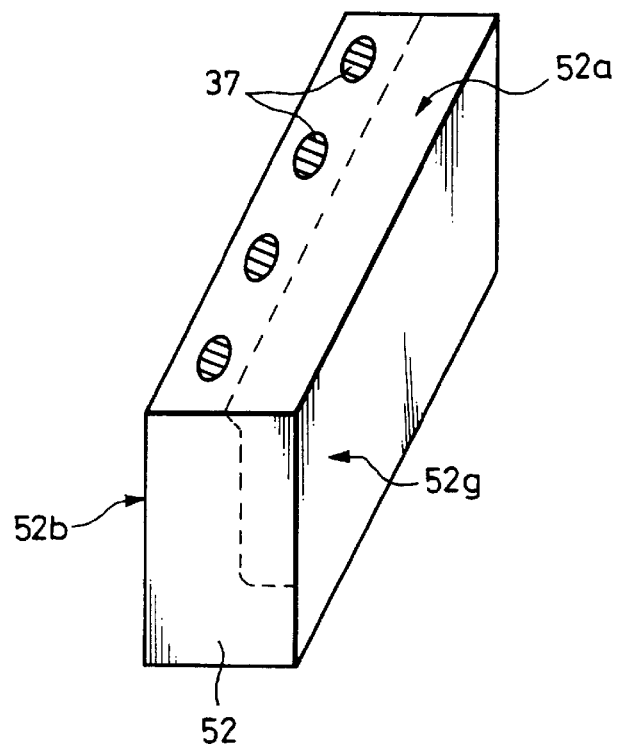
F I G. 15
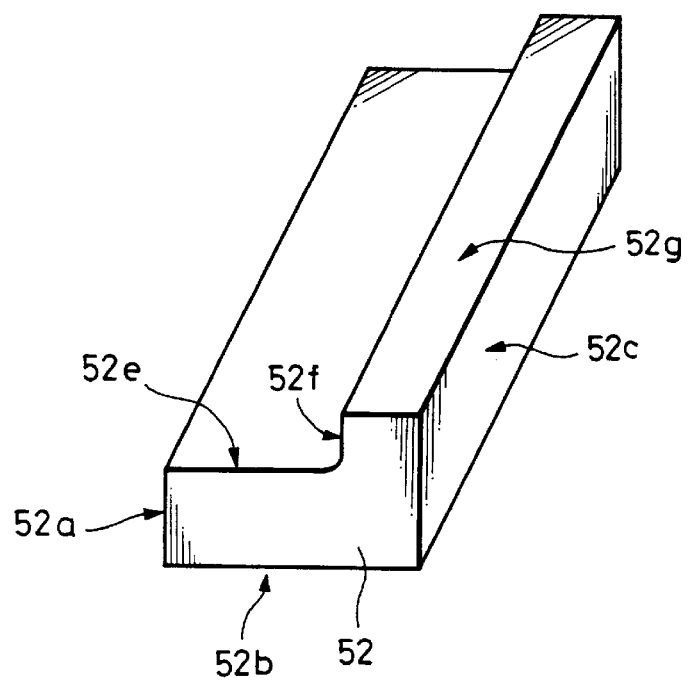

OPTICAL ELEMENT, ITS MANUFACTURING METHOD AND OPTICAL ELEMENT MANUFACTURING METAL DIE

This is a division of Ser. No. 09/487,216 filed Jan. 19, 2000, now U.S. Pat. No. 6,552,863.

BACKGROUND OF THE INVENTION

1. Field of the Invention

The present invention relates to an optical element which has a diffraction grating and a plurality of mirror surfaces and is molded by plastic molding, its manufacturing method and an optical element manufacturing metal die suited for use to manufacture the optical element.

2. Description of the Prior Art

Up to now, various kinds of patterning methods utilizing a lithography have been known and optical elements such as an optical integrated device, a diffraction grating and the like which are manufactured based on the patterning methods become commercialized.

These optical elements are generally manufactured as follows. First of all, a resist is coated on a surface of glass and a pattern is drawn on the resist to make a resist pattern. Next, using the resist pattern as a master, a nickel master (stamper) is obtained by way of a nickel electroforming method.

Then, using the nickel master, the optical elements can be obtained by a method of, for example, pressing a film against the master or by a method (so-called 2 P method) of, for example, pouring ultraviolet-setting resin on the master and then hardening it by way of ultraviolet irradiation to peel off a replica.

Also, in some cases, there are injection molded products, as represented by a general optical disc such as a compact disc and the like, on one surface or both surfaces of which a pattern or patterns are formed. Such products can be obtained by carrying out injection molding of resin after setting the above-mentioned master to an injection molding machine.

OBJECTS AND SUMMARY OF THE INVENTION

However, with the above-mentioned respective manufacturing methods, the surface on which a pattern is formed is limited to a plane. This makes it difficult to manufacture those complex structures of, for example, a structure having an inclined surface which is angled relative to a main surface in a plane where a pattern exists such as Foucault prism and a structure having a level difference in a plane where a pattern exists.

Further, when an optical element having mirror surfaces is formed by way of an injection molding method and the like, it is necessary to obtain predetermined flatness as well as roughness of a surface of a mirror forming portion in a metal die for forming a mirror surface of the optical element by polish-working (polishing), for example, after carrying out grind-working thereon using a grind stone.

For this reason, in a case of manufacturing a shape wherein a horizontal surface and an inclined surface mixedly exist as in, for example, the above-mentioned Foucault prism, it is necessary to divide a nesting in a metal die being a portion forming the shape into a plurality of nestings such as one for forming the horizontal surface and another for forming the inclined surface. Consequently, there is an increase in the number of parts of the metal die, which makes not only assembling of the metal die complicated but also the overall precision of the metal die inaccurate due to accumulation of mechanical shape precision of each of the nestings. Therefore, it becomes impossible to obtain a micron-order dimensional precision necessary for the optical element as a molded product.

Moreover, particularly in the case of the Foucault prism, when the nesting of the metal die is divided into a plurality of nestings to form the optical element, molding flashes occur at a joint plane of respective nestings. The optical element wherein flashes occur at the joint plane has involved a problem that optical characteristics deteriorate when a laser beam passes through the joint plane between the horizontal surface and the inclined surface.

In order to solve the above-mentioned problems, the present invention provides an optical element which has a complex structure such as the diffraction grating, the inclined surface, the difference in level, a curved surface and the like as well as has good optical characteristics, its manufacturing method and an optical element manufacturing metal die capable of injection molding even the optical element having a complex structure.

An optical element of the present invention has a plurality of mirror surfaces including at least two adjoining mirror surfaces and is formed by plastic molding with a metal die, the metal die being constituted to have at least one or more nestings each of which has a mirror surface forming portion, and the two adjoining mirror surfaces being molded by two adjoining mirror surface forming portions formed on the same nesting.

According to the optical element of the present invention, because it is molded by the two adjoining mirror surface forming portions integrated into the same nesting, there occurs no molding flashes at the joint plane between the two mirror surface as well as no deterioration of optical characteristics at the joint plane.

A manufacturing method of the optical element of the present invention is such that the metal die for carrying out the plastic molding has at least one or more nestings each of which has a plurality of adjoining mirror forming portions and the plurality of adjoining mirror surfaces of the optical element are molded by a plurality of mirror surface forming portions of the same nesting.

According to the manufacturing method of the optical element of the present invention, by molding the plurality of adjoining mirror surfaces of the optical element by the plurality of adjoining mirror surface forming portions, the optical element can be manufactured without generating molding flashes at the joint plane of a plurality of mirror surfaces.

The manufacturing method of the optical element of the present invention is such that the metal die for carrying out the plastic molding has at least one or more nestings each of which has a plurality of the mirror surface forming portions, at least one or more mirror surface forming portions of the plurality of mirror surface forming portions of the nesting being formed by a mirror surface grinding method, and a mirror surface of the optical element being molded by the mirror surface forming portion.

According to the above-mentioned manufacturing method of the optical element of the present invention, by forming at least one or more mirror surface forming portions by the mirror surface grinding method, one of two mirror surfaces having two mirror surfaces which form an angle, for example, between a horizontal surface and an inclined surface or one of two mirror surfaces having a difference in level can be molded using the mirror surface forming portion formed by the mirror surface grinding method. This makes it possible to manufacture the optical element having a complex structure such as the inclined surface, the difference in level and the like.

The optical element manufacturing metal die of the present invention is constituted to have at least one or more nestings each of which comprises the plurality of adjoining mirror surface forming portions for molding the mirror surfaces of the optical element.

According to the above-mentioned optical element manufacturing metal die of the present invention, because the nesting has the plurality of adjoining mirror surface forming portions, it is possible to carry out the molding without generating the molding flashes at the joint plane between the mirror surfaces of the optical element which are molded by the plurality of mirror surface forming portions.

The optical element manufacturing metal die of the present invention is constituted to have at least one or more nestings each of which has the plurality of mirror surface forming portions for molding the mirror surfaces of the optical element and at least one or more mirror surface forming portions of the plurality of mirror surface forming portions of the nesting are formed by the mirror surface grinding method.

According to the optical element manufacturing metal die of the present invention, because at least one or more mirror surface forming portions are formed by the mirror grinding method out of the plurality of mirror surface forming portions of the nesting, one of the two mirror surfaces making an angle, for example, between the horizontal surface and the inclined surface or one of the two mirror surfaces having a difference in level can be molded by the mirror grinded portion formed by the mirror surface grinding method. This makes it possible to manufacture the optical element of a structure having the two mirror surfaces forming an angle, the two mirror surfaces having a difference in level and the like.

The optical element manufacturing metal die of the present invention is constituted to include a nesting having a diffraction grating forming portion in which a concavo-convex pattern for molding the diffraction grating of the optical element is formed on at least one surface of a substrate.

According to the above-mentioned optical element manufacturing metal die of the present invention, because it has the diffraction grating forming portion wherein the predetermined concavo-convex pattern is formed on at least one surface of the substrate of the nesting in the metal die, it is possible to carry out the molding of the optical element having the diffraction grating more easily than the conventional molding method using a nickel master.

BRIEF DESCRIPTION OF THE DRAWINGS

FIG. 4 is a partially enlarged diagram of the second nesting in FIG. 3;

FIG. 14 is a process diagram showing the manufacturing process of the first nesting;

FIG. 15 is a process diagram showing the manufacturing process of the first nesting;

Figure 27:
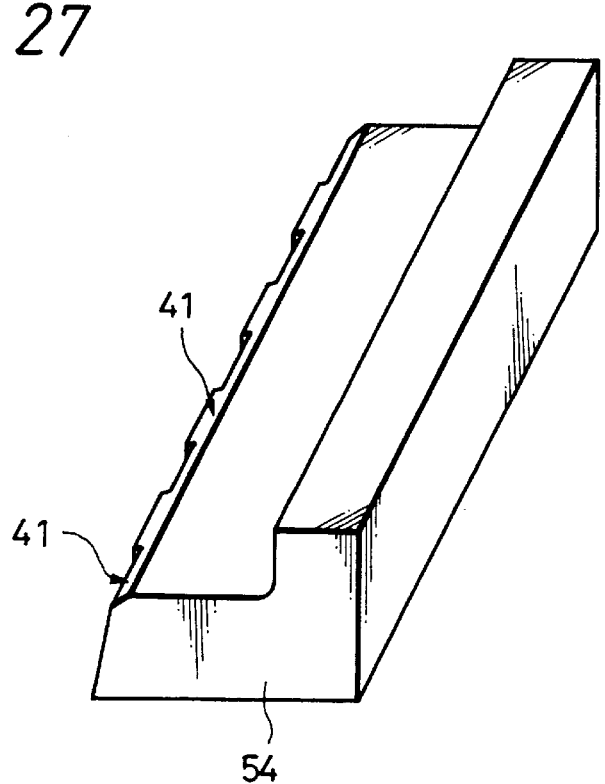
Figure 28:
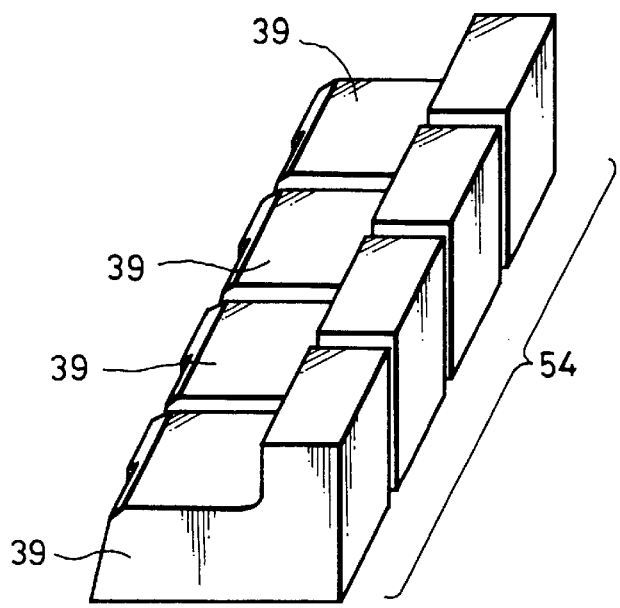
Figure 29:
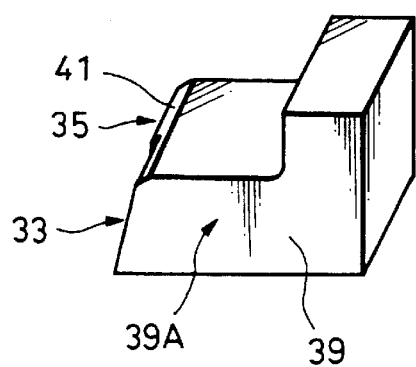

FIG.>26 is a process diagram showing the manufacturing process of the second nesting;

FIG. 27 is a process diagram showing the manufacturing process of the second nesting;

FIG. 28 is a process diagram showing the manufacturing process of the second nesting; and FIG. 29 is a process diagram showing the manufacturing process of the second nesting.

DESCRIPTION OF THE PREFERRED EMBODIMENTS

The present invention is an optical element which has a plurality of mirror surfaces including at least two adjoining mirror surfaces and is formed by plastic molding with a metal die which is constituted to have at least one or more nestings each having a mirror surface forming portion, and its two adjoining mirror surfaces are molded by the two adjoining mirror surface forming portions formed on the same nesting.

Moreover, the above-mentioned optical element according to the present invention is composed of amorphous polyolefin resin.

Furthermore, in the above-mentioned optical element according to the present invention, a diffraction grating is formed on at least one mirror surface of a plurality of mirror surfaces and the diffraction grating is molded by a diffraction grating forming portion having a concavo-convex pattern which is formed on the nesting.

The present invention is a manufacturing method of the optical element, in which plastic molding is carried out using a metal die which has at least one or more nestings each having a plurality of adjoining mirror surface forming portions and a plurality of adjoining mirror surfaces of the optical element are molded by a plurality of adjoining mirror surface forming portions of the same nesting.

The present invention is a manufacturing method of the optical element in which plastic molding is carried out with a metal die which has at least one or more nestings each having a plurality of mirror surface forming portions, at least one or more mirror surface forming portions of the plurality of mirror surface forming portions of the nesting being formed by a mirror surface forming grinding method, and mirror surfaces of the optical element being molded by the mirror surface forming portions.

The present invention is an optical element manufacturing metal die which is constituted to have one or more nestings each having a plurality of adjoining mirror surface forming portions for molding the mirror surfaces of the optical element.

The present invention is an optical element manufacturing metal die which is constituted to have one or more nestings each having a plurality of mirror surface forming portions for molding the mirror surfaces of the optical element, and at least one or more mirror surface forming portions of the plurality of mirror surface forming portions of the nesting is formed by the mirror surface grinding method.

The present invention is an optical element manufacturing metal die which is constituted to include a nesting having a diffraction grating forming portion of which a predetermined concavo-convex pattern for molding the mirror surface of the optical element is formed on at least one surface of a substrate.

Also, in the above-mentioned optical element manufacturing metal die of the present invention, the nesting has a diffraction grating forming portion and mirror surface forming portions for molding the mirror surfaces of the optical element, and the mirror surface forming portions include a mirror surface forming portion formed at least by a mirror surface grinding method.

Moreover, in the above-mentioned optical element manufacturing metal die of the present invention, a material of the substrate of the nesting is composed of martensite stainless steel or cemented carbide.

Further, in the above-mentioned optical element manufacturing metal die of the present invention, a material which is chemically and physically resistant to lithography, capable of a dry etching process, and endures a temperature and pressure at an injection molding process of the optical element films on one surface of the substrate on which the diffraction grating forming portion is formed.

FIG. 1 shows a schematic structural diagram of the optical element as one embodiment of the present invention.

Figure 1A:
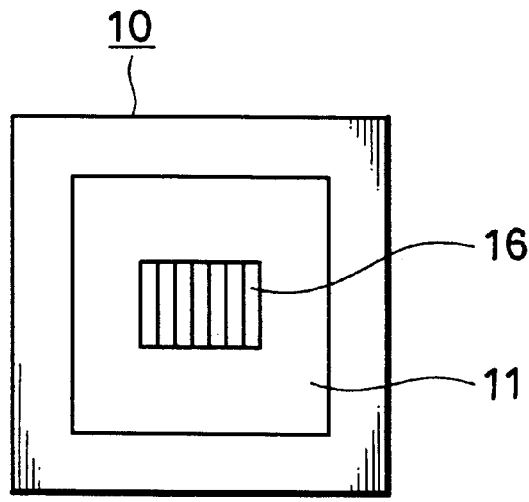
FIGS. 1 A to C are schematic structural diagrams of an optical element as one embodiment of the present invention.
Figure 1B:
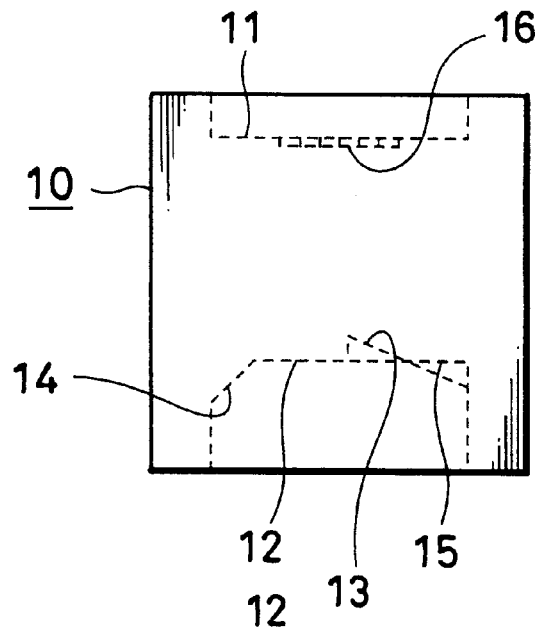
Figure 1C:
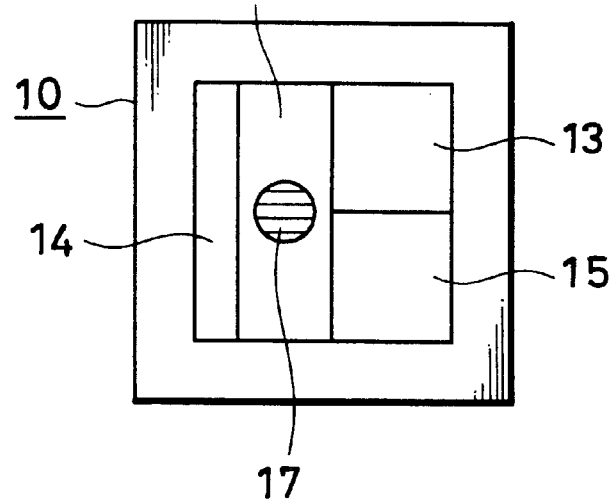

FIG. 1A shows an upper surface view; FIG. 1B shows a side view; FIG. 1C shows a bottom surface view.

This optical element 10 constitutes a complex optical element wherein a diffraction grating is formed on the upper surface side of a structure formed into a dice shape and on the bottom surface side, a diffraction grating and an optical surface angled relative to a main surface are formed.

That is, on the upper surface side, a first diffraction grating 16 is formed on a first mirror surface 11 which descends one step from the uppermost surface and on the opposing bottom surface side are formed a second mirror surface 12 which is parallel to the first mirror surface 11 and ascends one step from the bottom surface, a second diffraction grating 17, a third mirror surface 13 and a fourth mirror surface 14 which are angled relative to a ridgeline of the second mirror surface 12. Also, at an adjoining position to the third mirror surface 13, there is a fifth mirror surface 15 which is parallel to the second mirror surface 12.

The third mirror surface 13 and the fifth mirror surface 15 are called the Foucault prism and have a function of separating a laser beam into arbitrary angles by letting it pass through a joint plane of respective surfaces.

It is desirable that the optical element 10 is manufactured by an resin injection molding method when complexity of a shape, mass-productivity, and further costs or the like are taken into consideration.

Moreover, as to resin material used as a material of the optical element 10, resin of amorphous polyolefin system represented by thermoplastic resin of norbornene system and the like which are excellent in heat resistance, moldability, low hygroscopicity and the like is desirable.

Figure 2:
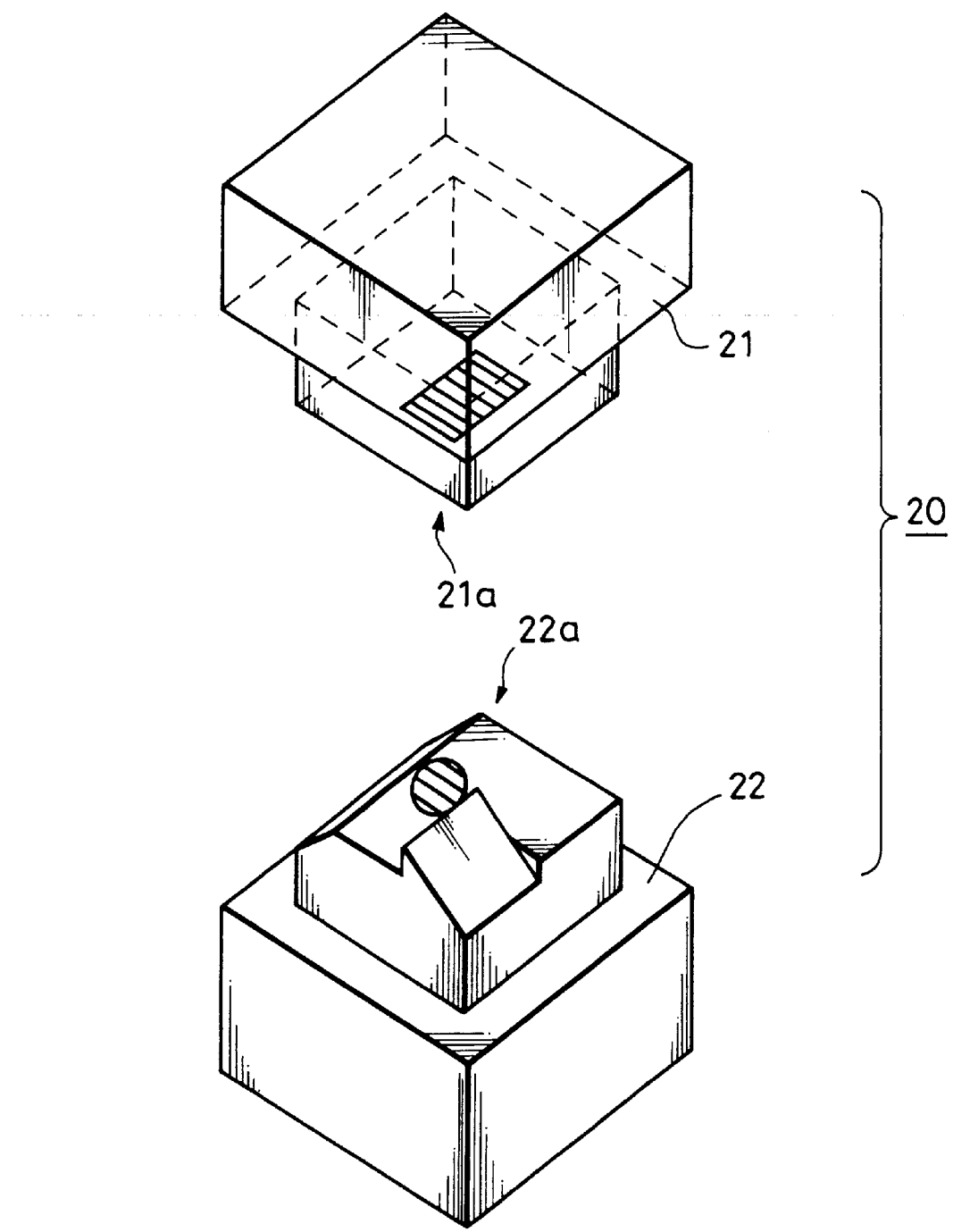
FIG. 2 is a diagram showing one form of an optical element manufacturing metal die used for injection molding of the optical element in FIG. 1.

Next, one form of the optical element manufacturing metal die used for injection molding of the optical element 10 is shown in FIG. 2.

As shown in FIG. 2, this metal die 20 is comprised of a movable metal die 21 and a fixed metal die 22. When the movable metal die 21 and the fixed metal die 22 are made to butt each other, there is provided a space to be filled in with the resin material.

The mutually opposing surfaces 21a and 22a in the movable metal die 21 and the fixed metal die 22 form an optical molding surface necessary for allowing an optical function of the optical element 10 its full play.

In the fixed metal die 22, a collective body 22a of a plurality of surfaces including an inclined surface which is angled relative to a horizontal surface forms the optical molding surface. In case of this fixed metal die 22, the optical molding surface comprises, for example, a portion for forming the diffraction grating, a portion for forming the mirror surface which is angled relative to the horizontal surface, or a portion for forming the Foucault prism and the like.

Additionally, in FIG. 2, a frame-shaped metal die to be assembled around the movable side metal die and the fixed side metal die is omitted.

Figure 3:
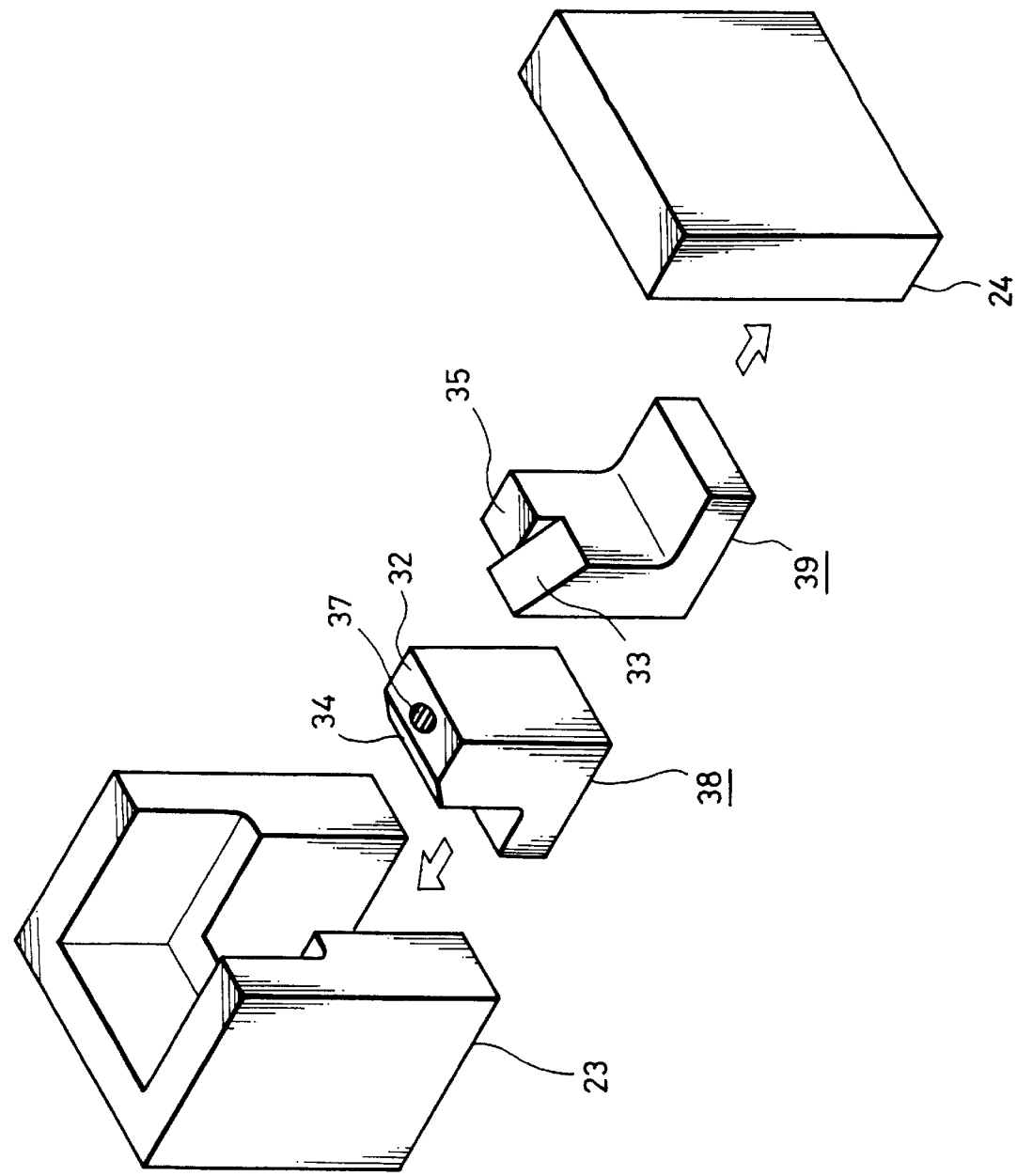
FIG. 3 is a diagram showing forms of nestings constituting a fixed metal die in FIG. 2.

One form of a nesting constituting the fixed metal die 22 in FIG. 2 is shown in FIG. 3.

Here, the fixed metal die 22 is divided into two nestings of the first nesting 38 and the second nesting 39.

The first nesting 38 comprises two surfaces of a second mirror surface forming portion 32 on which a diffraction grating forming portion 37 having a predetermined concavo-convex pattern is formed and a fourth mirror surface forming portion 34 which becomes an inclined surface angled relative to the second mirror surface forming portion 32.

The second mirror surface 12 and the fourth mirror surface 14 of the optical element are each molded by these adjoining second mirror surface forming portion 32 and fourth mirror surface forming portion 34, and also, the second diffraction grating 17 of the optical element 10 is molded by the diffraction grating forming portion 37.

Further, in the second nesting 39, a fifth mirror surface forming portion 35 and a third mirror surface forming portion 33 which becomes an inclined surface having an angle are formed adjoining one another.

The third mirror surface 13 and the fifth mirror surface 15 of the optical element 10 are molded by these adjoining third mirror surface forming portion 33 and fifth mirror surface forming portion 35, thereby constituting the Foucault prism made of the mirror surfaces 13, 15.

That is, the two adjoining mirror surface forming portions 33, 35 for forming the Foucault prism are integrated by the second nesting 39.

This is because, in the case of Foucault prism, the division of the nesting at the joint plane causes an occurrence of molding flashes thereat and in turn an deterioration of the optical characteristics when a laser beam passes through the joint plane between the horizontal surface and the inclined surface.

Moreover, a portion of the inclined surface, namely, the third mirror forming portion 33 is very difficult to polish due to its shape. Accordingly, the shape of the inclined surface is work-formed by a mirror surface grinding method.

Specifically, as a partially enlarged diagram of the second nesting 39 is shown in FIG. 4, minute radii R1, R2 at connecting portions at the joint plane between the third mirror surface forming portion 33 being the inclined surface and the fifth mirror surface forming portion 35 being the horizontal surface are mirror-surface polished to become equal to or less than 5 μm, respectively.

The third mirror surface forming portion 33 and the fifth mirror surface forming portion 35 need to be formed so that the flatness is λ/10 or less as well as the surface roughness Ra is 10 nm or less in an optical effective range even without carrying out polish-working.

These first nesting 38 and second nesting 39 are formed in a manner that each of their lower portions is formed wide like trailing a skirt, and the wide portions are combined with low portions of outer frames 23 and 24 of the respective metal dies in arrow directions so that the nestings 38, 39 may not jump out upward in the diagram when the metal dies are assembled.

In this regard, when it is arranged that the respective mirror surface forming portions 32, 33, 34, and 35 are formed by respective different nestings, the molding flashes occur at a time of molding as mentioned above and the nestings move in the midst of molding due to the existence of a clearance of each nesting, thereby making it difficult to obtain predetermined optical characteristics and a shape precision of several micron order.

For this reason, in the present embodiment, the adjoining mirror surface forming portions 32 and 34 are integrated by the first nesting 38 of unified structure without being divided, and the two mirror surface forming portions 33 and 35 for making the Foucault prism portion are integrated by the second nesting 39 of a unified structure without being divided.

The forming processes of the first nesting 38 and the second nesting 39 will be described with reference to drawings.

In any of the nestings 38 and 39, shapes of the nestings repeatedly disposed at predetermined intervals are formed on one surface of a substrate having an area several decade to several thousand times as large as that of the diffraction grating forming portion 37 and further, the substrate is cut thicknesswise to form a required shape of the nesting 38 or 39.

The forming process of the first nesting 38 will be described first.

Here, FIG. 5 to FIG. 10 show enlarged portions wherein a pattern of the diffraction grating forming portions 37 is formed.

Figure 5:
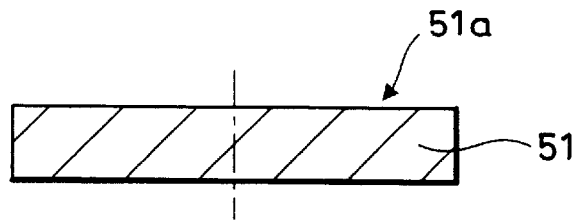
FIG. 5 is a process diagram (enlarged diagram of a part) showing a manufacturing process of the first nesting.

In the beginning, as shown in FIG. 5, a groundwork processing of a surface is performed to a surface 51a by way of a plating treatment or a vacuum filming, on which a concavo-convex pattern of the diffraction grating 37 of a substrate 51 is formed.

Further, a mirror-surface-working and the like are carried out on the surface which will become a mirror surface forming portion after the groundwork processing to obtain smoothness.

As to a material for the substrate 51, from view points of being excellent in thermal conductivity and corrosion resistance for an injection molding metal die or being suited for mirror-surface-working, martensite stainless steel, cemented carbide and the like are preferable.

Also, as to the thin film material for the groundwork processing, a material having hardness of HV300 or more in Vickers hardness suitable for the mirror-surface-working or a material which physically and chemically endures the lithography, is suited for a dry etching process as well as endures temperature and pressure at a time of the injection mold process of the optical element is desirable. From these points, materials of Ni—P or Cr, Pt, Ir, Ti and the like are preferable. Again, compounds which are equivalent to these materials can be used if they have the above-mentioned characteristics.

Figure 6:
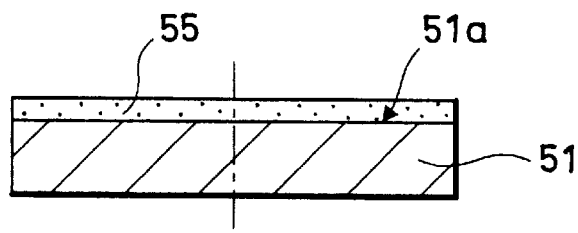
FIG. 6 is a process diagram (enlarged diagram of a part) showing the manufacturing process of the first nesting.

Next, as shown in FIG. 6, a resist 55 is applied to the surface 51a of the substrate 51 on which a surface treatment is performed.

Figure 7:
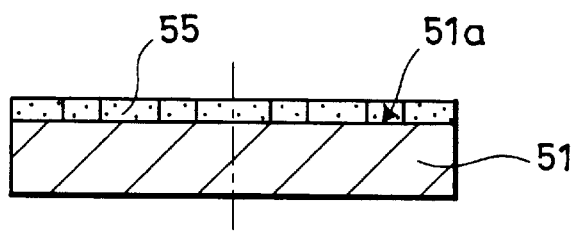
FIG. 7 is a process diagram (enlarged diagram of a part) showing the manufacturing process of the first nesting.

Next, as shown in FIG. 7 predetermined spots of the resist 55 corresponding to a transferred pattern are exposed to light by laser graphing, electronic beam graphing or a stepper and the like.

Figure 8:
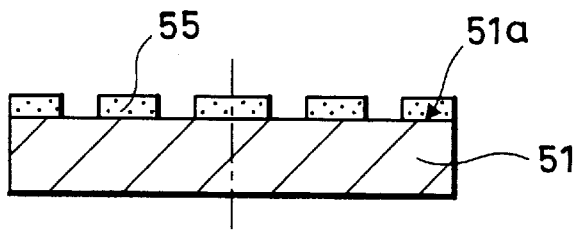
FIG. 8 is a process diagram (enlarged diagram of a part) showing the manufacturing process of the first nesting.

Next, as shown in FIG. 8, the resist 55 at unnecessary portions is removed.

If the resist 55 is, for example a positive resist, the light-exposed resist 55 is developed and then eliminated.

Figure 9:
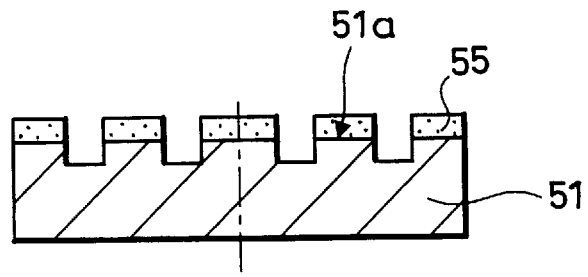
FIG. 9 is a process diagram (enlarged diagram of a part) showing the manufacturing process of the first nesting.

Subsequently, as shown in FIG. 9, the resist 55 which remains without being eliminated is made a mask to perform the dry etching process to the substrate 51 as deep as desired by, for example, ion milling and the like.

Figure 10:
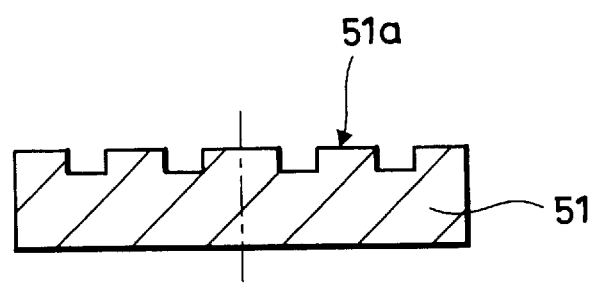
FIG. 10 is a process diagram (enlarged diagram of a part) showing the manufacturing process of the first nesting.

Finally, as shown in FIG. 10, the resist 55 made a mask is removed by washing and the concavo-convex pattern of the desired diffraction grating forming portion 37 is formed.

At this moment, since an area of the substrate 51 is several decade to several thousand times as large as that of the diffraction grating forming portion 37, several decades to several hundreds of diffraction grating forming portions 37 which are disposed at constant intervals on the surface 51a are formed.

Then, in correspondence to the diffraction grating forming portions 37 which are disposed at constant intervals on the surface 51a, the substrate 51 on which the diffraction grating forming portions 37 are formed in this manner is cut thicknesswise, that is, in a vertical direction relative to the surface 51a of the substrate 51.

Figure 11:
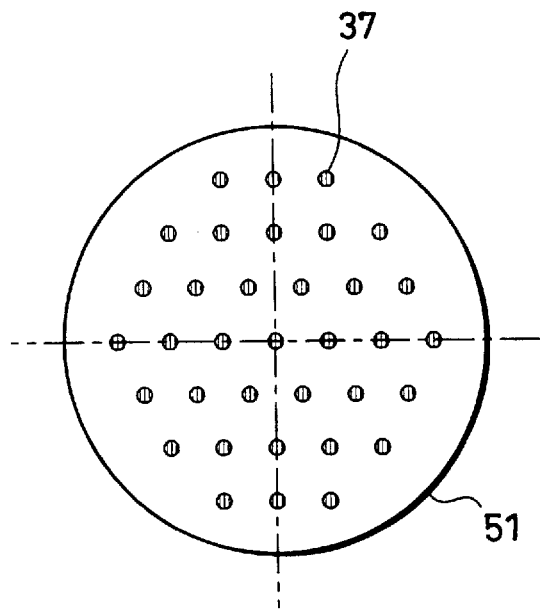
FIG. 11 is a plan view of an circular substrate with a diffraction grating forming portion formed thereon.

For example, a circular substrate 51 shown in FIG. 11 is cut in a grid shape. It is the same with a square substrate.

This makes it possible to manufacture the required first nesting 38 of which the concavo-convex pattern of the diffraction grating forming portion 37 is formed on the surface, or the second mirror surface forming portion 32.

Now, of the manufacturing processes of the first nesting 38, cutting, mirror surface grinding or polishing processes will be described in more detail.

Figure 12:
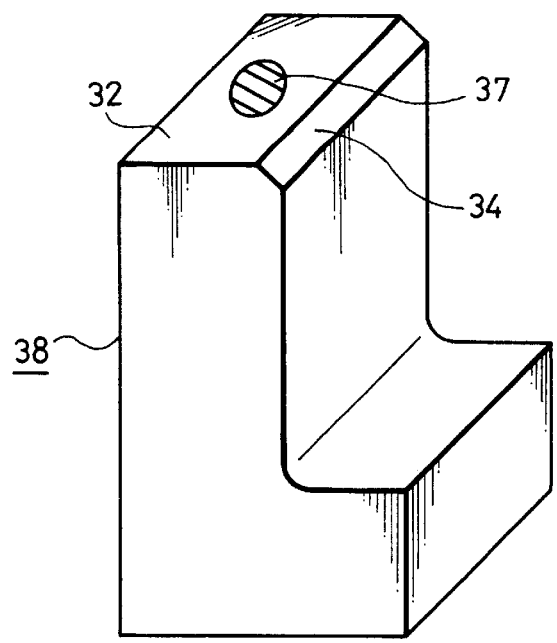
FIG. 12 is a perspective view of one form of the first nesting.

A perspective view of one form of the first nesting 38 is shown in FIG. 12.

In the first nesting 38, optical molding surfaces, that is, surfaces which need to be molded to satisfy predetermined optical characteristics are two surfaces of the second mirror surface forming portion 32 with the diffraction grating 37 being formed thereon and the fourth mirror surface forming portion 34 which is an inclined surface angled relative to the second mirror surface forming portion 32.

Figure 13:
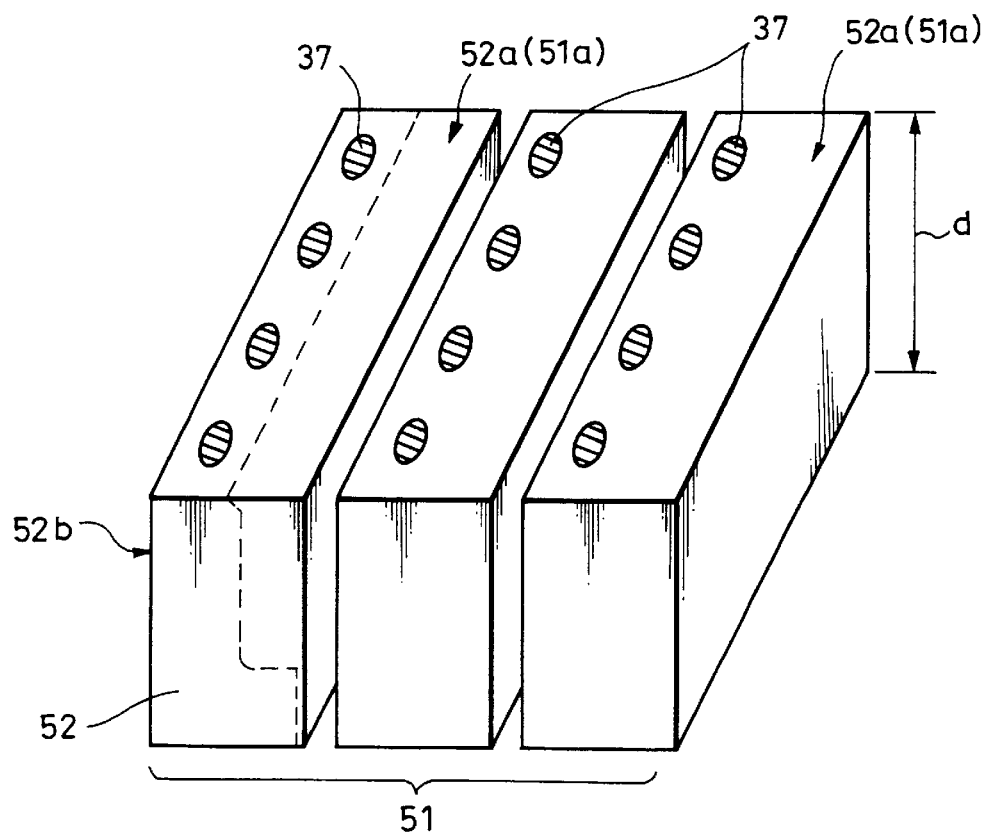
FIG. 13 is a process diagram showing the manufacturing process of the first nesting.

First of all, a diagram of the substrate 51 in a state of being cut thicknesswise will be shown in FIG. 13. A Predetermined number of the diffraction grating patterns 37 are disposed on the substrate 51 having, for example, a 55 mm square surface 51a with a thickness of d, for example, 9 mm or so.

Using these patterns as a reference, the substrate 51 is cut so as to obtain a stick-shaped elongated cut piece 52. 52b in the figure denotes its cut surface.

In this case, four pieces of patterns of the diffraction grating forming portions 37 are disposed in the longitudinal direction in FIG. 13, but in fact several pieces to several decade pieces of the patterns 37 are disposed in the longitudinal direction.

In this connection, in order to make working allowance of a grinding process equal to or less than 5 $\mu$m after the cutting, a diameter of an abrasive grain of a cutting grind stone is desirably equal to or less than 50 $\mu$m.

In addition, the surface 51a of the substrate 51 may be a circular shape of, for example, 55 mm diameter as shown in FIG. 11.

Next, as shown in FIG. 14, the cut surfaces 52b, 52g of the cut piece 52 are grinded to finish a width of the cut piece 52 to a predetermined dimension.

Next, as shown in FIG. 15, the cut piece 52 is cut along a broken line in FIG. 14 to form two surfaces 52e, 52f as outer peripheral surfaces of the first nesting 38.

Figure 16:
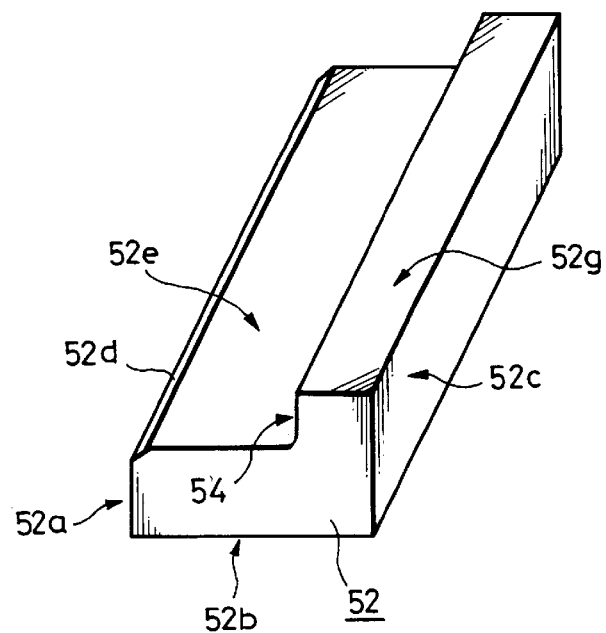
FIG. 16 is a process diagram showing the manufacturing process of the first nesting.

Next, as shown in FIG. 16, a surface 52d of the cut piece 52, constituting the fourth mirror surface forming portion 34 is work-formed to a predetermined dimension by the mirror surface grinding method.

A diameter of an abrasive grain of a grind stone used herein is desirably equal to or less than 5 $\mu$m. This is for forming the 52d so that its flatness may be equal to or less than $\lambda/10$ as well as surface roughness Ra may be equal to or less than 10 nm in an optical effective range even without carrying out grind-working.

Moreover, there is a need that the shape of the grind stone should be corrected with extreme high precision in a grinding machine (a state of being mounted on the grinding machine), or outside thereof (a state of being demounted from the grinding machine).

Additionally, after the working by the mirror surface grinding method, there may be a case where a polish-working is carried out as need arises.

Figure 17:
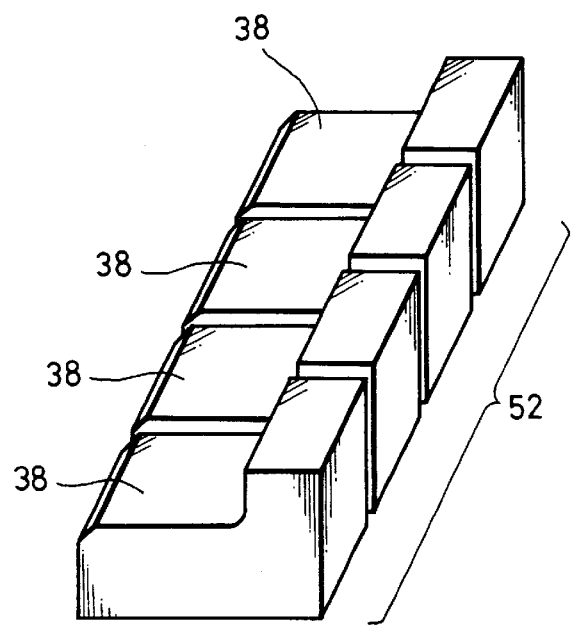
FIG. 17 is a process diagram showing the manufacturing process of the first nesting.

Next, as shown in FIG. 17, the stick-shaped elongated cut piece 52 is cut one by one into the first nestings 38.

On this occasion, in order to make working allowance equal to or less than 5 $\mu$m after the cutting, a diameter of an abrasive grain of a cutting grind stone is desirably equal to or less than 50 $\mu$m.

Figure 18:
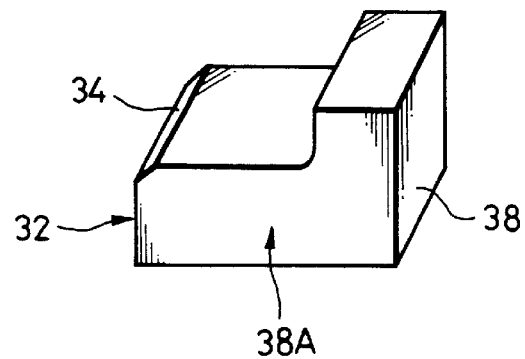
FIG. 18 is a process diagram showing the manufacturing process of the first nesting.

Finally, as shown in FIG. 18, by polish-working the cut surface 38A in the cutting process of FIG. 17 to finish it to a predetermined dimension, the first nesting 38 is completed.

Next, a manufacturing process of the second nesting 39 will be described.

Figure 19:
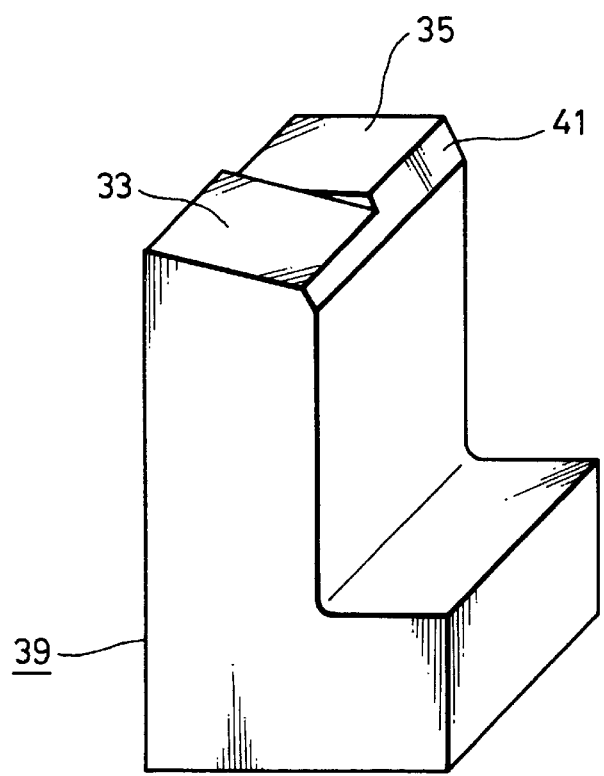
FIG. 19 is a perspective view of one form of the second nesting.

A perspective view of one form of the second nesting 39 is shown in FIG. 19.

The second nesting 39 has, in addition to the structure of the second nesting 39 shown in schematic diagrams of FIG. 3 and FIG. 4, a sixth mirror surface forming portion 41 as another inclined surface further angled relative to the fifth mirror surface forming portion 35.

The optical molding surfaces in the second nesting 39 are three surfaces including two surfaces where the fifth mirror surface forming portion 35 and the third mirror surface forming portion 33 being an inclined surface angled relative to the fifth mirror surface forming portion 35 adjoin to form the Foucault prism, and the sixth mirror surface forming portion 41 being yet another inclined surface.

Though not shown, a substrate 53 composed of the same material as that of the substrate 51 used for manufacturing the first nesting 38 is prepared first.

Figure 20:
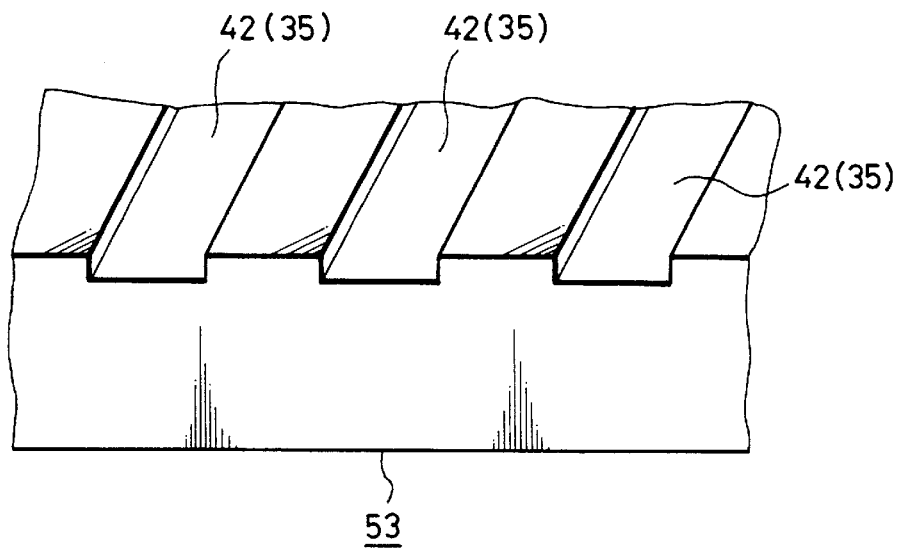
FIG. 20 is a process diagram showing a manufacturing process of the second nesting.

Next, by carrying out mirror surface grooving grind-working to the substrate 53 as shown in FIG. 20, grooves 42 which will become the fifth mirror surface forming portions 35 are formed.

The grooves 42 are formed by working based on the mirror surface grinding method at intervals of 5 mm on a mirror surface of the substrate 53 of, for example, diameter 55 mm or a 55 mm square and the thickness of about 9 mm.

In this connection, a diameter of an abrasive grain of a grind stone used is desirably equal to or less than 5 $\mu$m. Also, the shape of the grind stone must be corrected with high precision as mentioned above.

Next, there can be a case where a bottom of the groove 42 is subjected to polish-working so as to improve surface roughness Ra.

Figure 21:
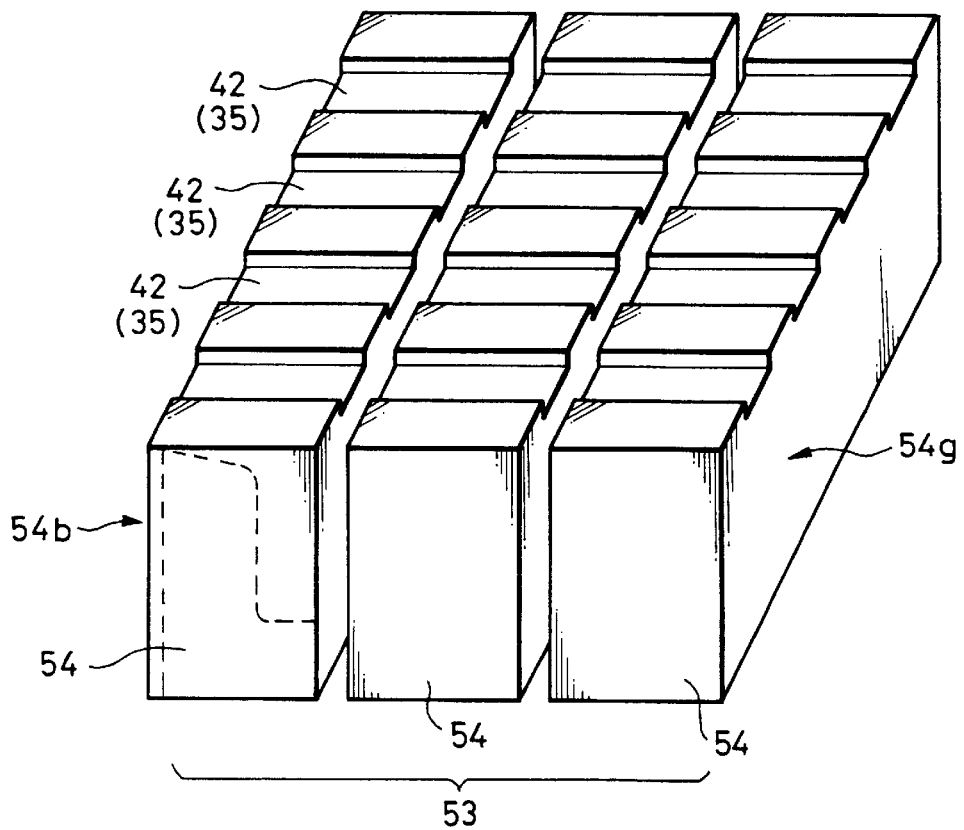
FIG. 21 is a process diagram showing the manufacturing process of the second nesting.

Next, as shown in FIG. 21, the substrate 53 is cut at right angles with the grooves 42 to obtain cut pieces 54. 54b in the figure denotes its cut surface.

Furthermore, in the mirror surface grooving grind-working with the grind stone, since flatness deteriorates when the grind stone escapes from a workpiece during the groove-working, the cut piece 54 is beforehand cut wider by about 2 mm.

Figure 22:
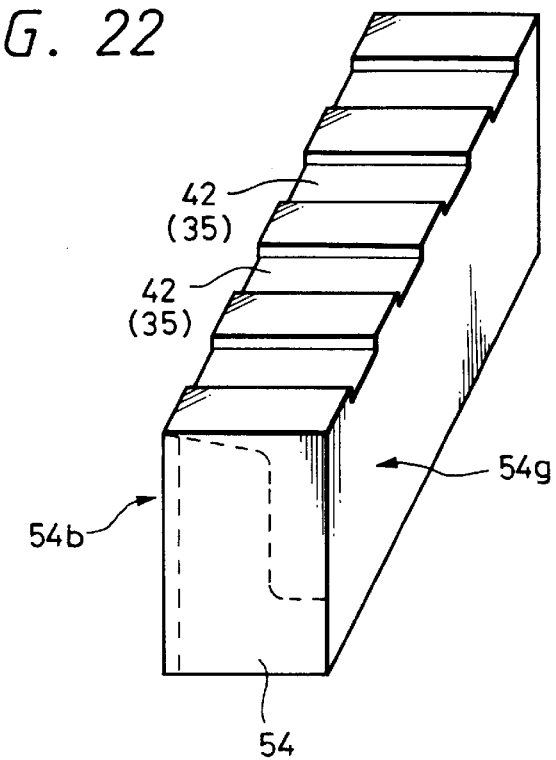
FIG. 22 is a process diagram showing the manufacturing process of the second nesting.

Next, as shown in FIG. 22, cut surfaces 54b, 54g of the cut piece are grinded to finish them to predetermined[0073]

Figure 23:
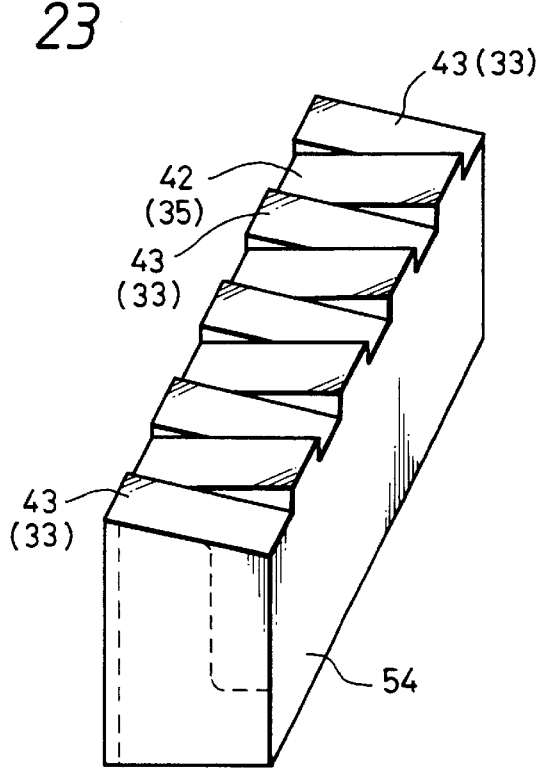
FIG. 23 is a process diagram showing the manufacturing process of the second nesting.

Next, as shown in FIG. 23, in order to form a structure of the Foucault prism (See FIG. 19) in which the third mirror surface forming portion 33 adjoins the fifth mirror surface forming portion 35 at an angle relative to the latter, an inclined grooves 43 relative to the horizontal grooves 42 are formed between the previously formed grooves 42.

In this case, since it is very difficult to polish-work due to its shape the inclined groove 43, that is, the inclined surface groove 43 which will become the third mirror surface forming portion 33, it is working-formed by the mirror surface grinding method.

In this regard, a diameter of an abrasive grain of a grind stone for use is desirably 5 $\mu$m or less.

Also, the shape of the grind stone must be corrected with extreme high precision as described above.

In addition, after the working by the mirror surface grinding method, there may be a case where polish-working is also carried out as need arises.

Specifically, a portion between the horizontal groove 42 and the inclined surface groove 43 is worked so that minute radii R1, R2 at connecting points of the joint plane as shown in FIG. 4 may be, e.g. 5 µm or less by the mirror surface grinding method.

Furthermore, surfaces which will become the third mirror surface forming portion 33 and the fifth mirror surface forming portion 35, that is, a bottom surface of the inclined surface groove 42 and a bottom surface of the horizontal surface groove 42 need both to be manufactured so that flatness may be λ/10 or less as well as surface roughness may be 10 nm or less in the optical effective range without any grind-working.

By forming the inclined surface groove 43 between the horizontal grooves 42, the second nesting 39 to be later formed becomes a structure in which the joint plane of the fifth mirror surface forming portion 35 as a horizontal surface and the third mirror surface forming portion 33 as an inclined surface is integrated.

As described above, if the third mirror surface forming portion 33 and the fifth mirror surface forming portion 35 which adjoin to each other are separated into different parts, it is difficult to obtain predetermined optical characteristic and shape precision of several micron order. Thus, the integrated structure of this sort is desirable.

Figure 24:
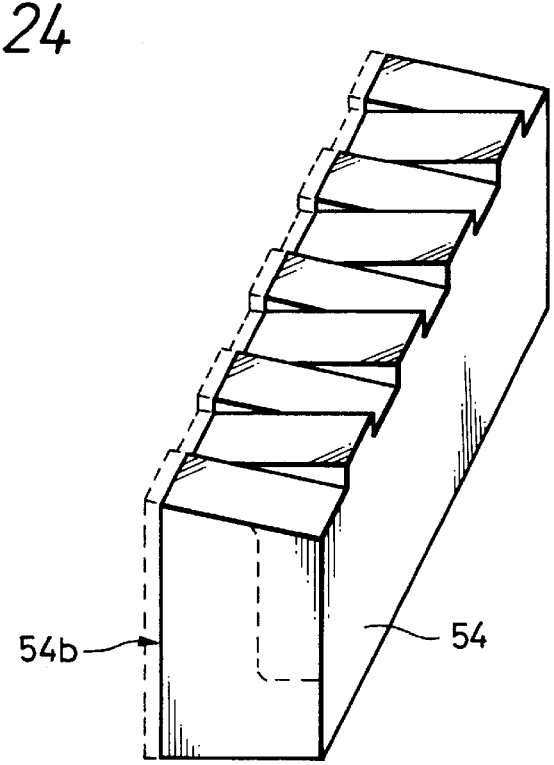
FIG. 24 is a process diagram showing the manufacturing process of the second nesting.

Next, as shown in FIG. 24, an unnecessary portion of about 2 mm on the cut surface 54b side of the cut piece 54 is cut-worked.

In this regard, in order to make working allowance for a polishing process after the cutting equal to or less than 5 µm, a diameter of an abrasive grain of a cutting grind stone is desirably equal to or less than 50 µm.

Figure 25:
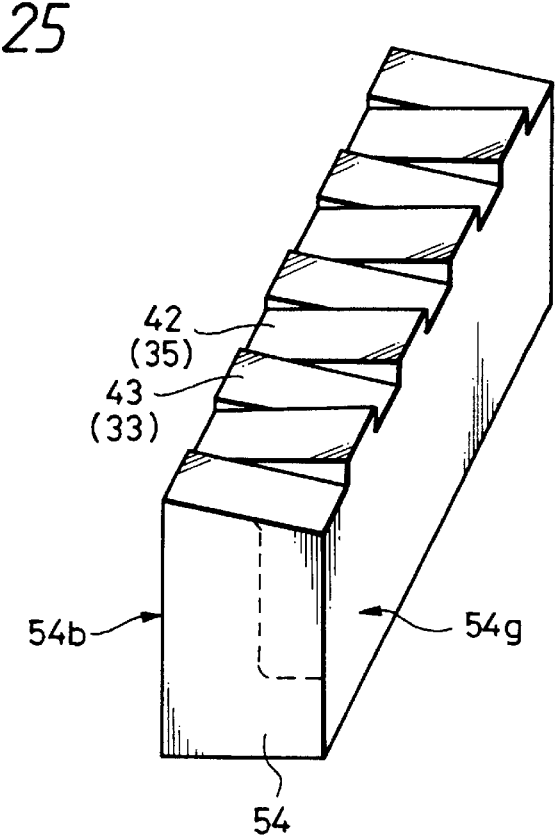
FIG. 25 is a process diagram showing the manufacturing process of the second nesting.

Next, as shown in FIG. 25, by polishing the cut surfaces 54b, 54g, a width of the cut piece 54 is finished to a predetermined dimension.

Figure 26:
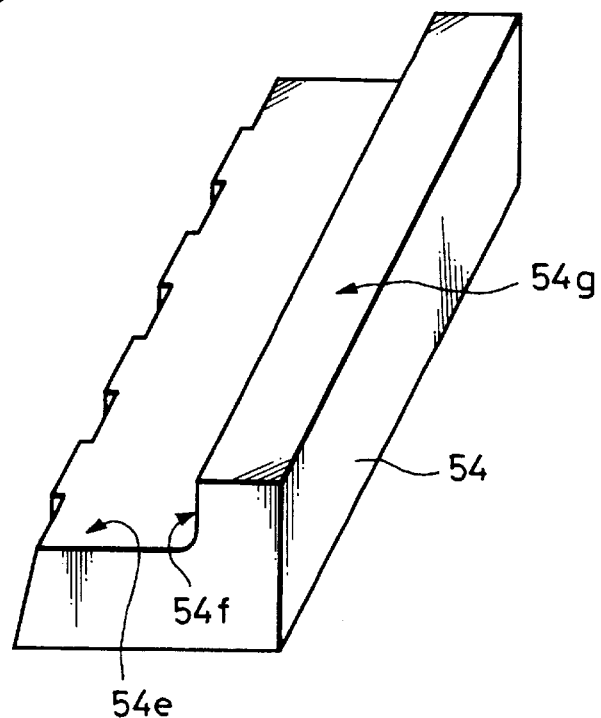

Next, as shown in FIG. 26, the cut piece 52 is cut along the broken line in FIG. 25 and two surfaces 54e, 54f are worked as outer peripheral surfaces of the second nesting 39.

Next, as shown in FIG. 27, an inclined surface which will become the sixth mirror surface forming portion 41 is formed and the inclined surface is worked to predetermined dimensions by the mirror surface grinding method.

A diameter of an abrasive grain of a grind stone used herein is desirably 5 µm or less.

Also, a shape of the grind stone must be corrected with high precision as described above.

After the working by the mirror surface grinding method, there may be a case where polish-working is also carried out as need arises.

Next, as shown in FIG. 28, the stick-shaped elongated cut piece 54 is cut one by one into the shape of the second nesting 39.

On this occasion, in order to make working allowance for the polishing process after the cutting equal to or less than 5 µm, a diameter of an abrasive grain of a cutting grind stone is desirably equal to or less than 50 µm.

Finally, as shown in FIG. 29, by polish-working a cut surface 39A in the cutting process of FIG. 28 to finish it to predetermined dimensions, the second nesting 39 is completed.

Using the fixed side metal die 22 comprising the first nesting 38 and the second nesting 39 thus manufactured, the optical element 10 can be manufactured by the plastic injection molding method.

According to the above-mentioned embodiment, since the first nesting 38 and the second nesting 39 of the fixed side metal die 22 are formed into the structure integrating the plurality of adjoining optical molding surfaces 32, 34, and 33, 35, 41, the optical element 10 obtained by molding with the fixed metal die 22 has no molding flashes between the second mirror surface 12 including the diffraction grating 17 and the fourth mirror surface 14 being a continuous inclined surface, and also no molding flashes between the third mirror surface 13 and the fifth mirror surface 15 which constitute the Foucault prism.

Therefore, it is possible to obtain the optical element 10 which can stably provide predetermined optical characteristics as well as has a shape precision of several micron order.

Moreover, since the first nesting 38 with the diffraction grating forming portion 37 has the transferred pattern formed on a hard thin film coated on the surface 51a of the substrate 51 directly by the lithography, the dry etching and the like, as compared with the case of using a nickel master on which the pattern of the diffraction grating is formed by the conventional nickel electroforming and the like, the metal die structure can be simplified.

More further, it is possible to improve the surface precision of the diffraction grating forming portion 37 on which the concavo-convex pattern is formed and because, in the diffraction grating forming portion 37, there occurs no abrasion of projecting portions of the substrate 51 due to protection by the hard thin film, it is possible to implement a long life span of the first nesting 38, that is, the metal die 20.

Furthermore, by using the optical element manufacturing metal die 20 which is comprised of the diffraction grating forming portion 37 having the concavo-convex pattern and the nestings 38, 39 having the mirror surface forming portions 32, 33, 34, 35, 41, it is possible to manufacture the optical element 10 having a part with the inclined surface on the optical molding surface such as the Foucault prism thereon.

It is also possible to manufacture an optical element other than the above-mentioned embodiment, of a complex structure wherein there are a difference in level on the optical molding surface and the like by using a metal die comprised of nestings having a plurality of mirror surface forming portions which have a difference in level.

In other words, according to the present invention, it is possible to easily form the concavo-convex pattern of the diffraction grating forming portion on the nesting constituting the metal die directly by the lithography, the dry etching and the like as well as to form the mirror surface forming portion of the inclined surface by directly conducting the mirror surface grinding.

Furthermore, by defining the state of the surface of the mirror surface forming portion after the mirror surface grinding as described above, it is possible to form the nesting of a high precision by raising the shape precision of the mirror surface forming portion.

Therefore, even with an optical element having a complex structure comprising a diffraction grating, an inclined surface, a difference in level and the like, by carrying out an injection molding with a metal die comprised of nestings having a high shape precision capable of carrying out injection molding of a required structure of an optical element, it is possible to obtain an optical element which has no molding flashes and stabilized optical characteristics.

The optical element according to the present invention can be applied to, other than the Foucault prism shown in the aforesaid embodiment, for example, a laser non-aberration optical element of a monochromatic light, a reference wave surface standard of an optical interferometer or various kinds of optical elements, optical devices, etc. represented by an aspherical lens.

In those cases, too, it will be sufficient to construct a metal die having the nesting of a shape corresponding to a structure of an optical element and to carry out plastic injection molding using the metal die.

The present invention is not limited to the above-mentioned embodiment, but can employ various other arrangements without departing from the gist of the present invention.

According to the present invention, since molding is carried out using the metal die constituted so that adjoining mirror surface forming portions may be integrated into the same nesting, there exist no molding flashes in the joint plane of adjoining mirror surfaces of the optical element obtained by the molding, thereby making it possible to stably provide the predetermined optical characteristics as well as to mold the optical element having a still higher shape precision.

Moreover, according to the present invention, by constituting the metal die using the nestings having the plurality of mirror surface forming portions which are formed by the mirror surface grinding method, it will become possible to manufacture the optical element of the complex structure comprised of the plurality of mirror surfaces each having an angle, the plurality of mirror surfaces having a difference in level and the like.

Furthermore, according to the present invention, one surface of the substrate of the nesting of the metal die has the diffraction grating forming portion with the predetermined concavo-convex pattern being formed thereon, and the predetermined concavo-convex pattern is capable of being easily formed by, for example, the lithography, the dry etching, and the like, so that, as compared with the conventional case of using the nickel master formed by the conventional mickel electroforming method and the like, the structure of the metal die can be simplified.

In addition, when the structure is arranged so that the hard thin film is formed on the surface of the substrate of the nesting and the diffraction grating forming portion having the predetermined concavo-convex pattern is formed thereon, it is possible to implement the improvement of the surface precision of the diffraction grating forming portion on which the pattern is formed as well as the long life span of the nesting and the metal die.

Having described preferred embodiments of the present invention with reference to the accompanying drawings, it is to be understood that the present invention is not limited to the above-mentioned embodiments and that various changes and modifications can be effected therein by those skilled in the art without departing from the spirit or scope of the present invention as defined in the appended claims.

What is claimed is:

1. A manufacturing method of an optical element by plastic molding with a metal die, characterized in that said metal die has at least two or more nestings having a plurality of adjoining mirror surface forming portions and a diffraction grating and a plurality of mirror surfaces of the optical element are molded by said plurality of adjoining mirror surface forming portions of said nesting.

2. A method of manufacturing an optical element, comprising:

dividing a metal die into a plurality of nestings, wherein each nesting has a plurality of adjoining mirror surfaces forming portions;

molding a plurality of mirror surfaces of said optical element using said plurality of adjoining mirror surface forming portions; and forming a diffraction grating on one of two joining mirror surfaces of said plurality of adjoining mirror surfaces, wherein said diffraction grating is molded by a mirror forming portion having a concave-convex pattern formed on said nesting.

3. The method of manufacturing an optical element as claimed in claim 2, wherein said optical element is composed of amorphous polyolefin resin.

4. The method of manufacturing an optical element as claimed in claim 2, further comprising:

molding a second mirror surface of said adjoining two mirror surfaces so that the second mirror surface is angled relative to one of a horizontal plane or a prism.

* * * * *

UNITED STATES PATENT AND TRADEMARK OFFICE
CERTIFICATE OF CORRECTION

PATENT NO. : 6,721,097 B2 Page 1 of 1
DATED : April 13, 20004
INVENTOR(S) : Yoshinari Kawashima It is certified that error appears in the above-identified patent and that said Letters Patent is hereby corrected as shown below:

Column 14,
Line 31, "two joining" should read -- two adjoining --.

Signed and Sealed this

Twenty-third Day of November, 2004

JON W. DUDAS
*Director of the United States Patent and Trademark Office*